US011478835B2

(12) United States Patent
Wilhelm et al.

(10) Patent No.: US 11,478,835 B2
(45) Date of Patent: Oct. 25, 2022

(54) MACHINING PLANAR WORKPIECES

(71) Applicant: TRUMPF Werkzeugmaschinen GmbH + Co. KG, Ditzingen (DE)

(72) Inventors: Markus Wilhelm, Gerlingen (DE); Rainer Hank, Eberdingen/Hochdorf (DE); Marc Klinkhammer, Ditzingen (DE); Leonard Schindewolf, Rutesheim (DE); Simon Ockenfuss, Boeblingen (DE); Jens Kappes, Feinfelden-Echterdingen (DE); Dennis Traenklein, Nufringen (DE); Alexander Tatarczyk, Hoeffingen (DE); Joerg Neupert, Stuttgart (DE); Dominik Bitto, Muenchingen (DE); Markus Maatz, Leinfelden-Echterdingen (DE); Christian Jakisch, Boeblingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 55 days.

(21) Appl. No.: 16/363,521

(22) Filed: Mar. 25, 2019

(65) Prior Publication Data
US 2019/0217370 A1 Jul. 18, 2019

Related U.S. Application Data

(63) Continuation of application No. PCT/EP2017/074335, filed on Sep. 26, 2017.

(30) Foreign Application Priority Data

Sep. 26, 2016 (DE) .......................... 102016118175.7

(51) Int. Cl.
B21D 19/08 (2006.01)
B21D 35/00 (2006.01)
(Continued)

(52) U.S. Cl.
CPC ............ B21D 19/08 (2013.01); B21D 35/001 (2013.01); B21D 37/12 (2013.01); B23K 26/38 (2013.01); *B21D 37/08* (2013.01)

(58) Field of Classification Search
CPC ...... B21D 19/08; B21D 19/00; B21D 19/084; B21D 19/10; B21D 37/12; B21D 37/08;
(Continued)

(56) References Cited

U.S. PATENT DOCUMENTS 4,520,646 A * 6/1985 Pauzin ................... B21D 19/08
72/313
4,891,964 A * 1/1990 Hallstrom .............. B21D 39/00
72/308
(Continued)

FOREIGN PATENT DOCUMENTS

CN 101610857 A 12/2009
CN 104438529 A 3/2015
(Continued)

OTHER PUBLICATIONS

English translate (JP2005131655A), retrieved date Sep. 22, 2020.*
(Continued)

*Primary Examiner* — Adam J Eiseman
*Assistant Examiner* — Mohammed S. Alawadi
(74) *Attorney, Agent, or Firm* — Fish & Richardson P.C.

(57) ABSTRACT

A planar workpiece machining device has an upper tool and a lower tool that are movable toward each other in a reciprocation direction and in the opposite direction to machine a workpiece arranged therebetween. The upper tool has a clamping shaft, an upper main body, and a tool body arranged opposite the clamping shaft on the main body and having an upper bending edge. The lower tool has a lower main body, on which a counter tool body having a lower bending edge and a counter holder are provided. The lower (Continued)

bending edge is oriented facing the counter holder. The upper bending edge is stationary to the upper main body, and the lower bending edge is stationary to the lower main body. The upper bending edge is associated with an undercut on the tool body and the lower bending edge is associated with an undercut on the counter tool body.

15 Claims, 10 Drawing Sheets

(51) Int. Cl.
  *B21D 37/12* (2006.01)
  *B23K 26/38* (2014.01)
  *B21D 37/08* (2006.01)

(58) Field of Classification Search
  CPC .......... B21D 35/001; B21D 5/01; B21D 5/04; B21D 5/45
  See application file for complete search history.

(56) References Cited

U.S. PATENT DOCUMENTS

| | | | | |
|---|---|---|---|---|
| 5,123,270 | A * | 6/1992 | Salvagnini | B21D 5/045 72/322 |
| 5,367,770 | A * | 11/1994 | McCaughey | E06B 3/5892 29/DIG. 33 |
| 5,842,369 | A * | 12/1998 | Kutschker | B21D 5/04 72/319 |
| 6,058,756 | A * | 5/2000 | Kutschker | B21D 5/042 72/319 |
| 6,196,041 | B1 * | 3/2001 | Codatto | B21D 5/04 72/322 |
| 6,295,858 | B1 * | 10/2001 | Torito | B21D 39/021 29/243.58 |
| 6,347,539 | B1 * | 2/2002 | Sekido | B21D 9/04 72/309 |
| 7,237,419 | B2 * | 7/2007 | Fielder | B21D 5/04 72/309 |
| 7,659,490 | B2 * | 2/2010 | Beilke | B21D 35/00 219/121.72 |
| 8,087,278 | B2 * | 1/2012 | Deis | B21D 5/042 72/384 |
| 9,481,019 | B2 * | 11/2016 | Koak | B21D 5/01 |
| 10,226,805 | B2 * | 3/2019 | Choi | B21D 37/08 |
| 10,449,592 | B2 | 10/2019 | Mathias et al. | |
| 10,464,114 | B2 * | 11/2019 | Angerer | B21C 51/00 |
| 2010/0101297 | A1 * | 4/2010 | Bauer | B21D 5/045 72/386 |
| 2014/0090443 | A1 | 4/2014 | Schmauder et al. | |
| 2014/0283576 | A1 * | 9/2014 | Jin | B21D 5/02 72/413 |

FOREIGN PATENT DOCUMENTS

| | | | | |
|---|---|---|---|---|
| CN | 104520029 | A | 4/2015 | |
| EP | 0089904 | B1 | 1/1986 | |
| EP | 0610706 | A1 | 8/1994 | |
| EP | 1584385 | A1 | 10/2005 | |
| EP | 2527058 | B1 | 11/2012 | |
| EP | 3106241 | A1 | 12/2016 | |
| FR | 2985672 | A1 * | 7/2013 | ............. B21D 53/88 |
| JP | H 07299521 | | 11/1995 | |
| JP | 2005131655 | A * | 5/2000 | |

OTHER PUBLICATIONS

English translate (FR2985672A1), retrieved date Sep. 22, 2020.*
International Search Report and writing Opinion in international Application No. PCT/EP2017/074335, dated Jan. 2018, 19 pages (with English translation).*
International Preliminary Report on Patentability in International Application No. PCT/EP2017/074335, dated Mar. 26, 2019, 9 pages (English translation).
International Search Report and Written Opinion in International Application No. PCT/EP2017/074335, dated Jan. 9, 218, 19 pages (with English translation).

* cited by examiner

MACHINING PLANAR WORKPIECES

CROSS REFERENCE TO RELATED APPLICATIONS

This application is a continuation of and claims priority under 35 U.S.C. § 120 from PCT Application No. PCT/EP2017/074335 filed on Sep. 26, 2017, which claims priority from German Application No. 10 2016 118 175.7, filed on Sep. 26, 2016. The entire contents of each of these priority applications are incorporated herein by reference.

TECHNICAL FIELD

The invention relates to a tool, a machine tool, and a method for machining planar workpieces, in particular metal sheets.

BACKGROUND

A bending tool for bending workpieces, in particular metal sheets, along a bend line, is known from EP 1 584 385 A1. Said tool comprises an upper tool having a main body, on which a tool body comprising a bending edge is provided. A lower tool is provided opposite said upper tool and comprises a counter tool body having a bending edge. A counterhold is provided on the lower tool adjacently to the counter tool body. The workpiece rests on the counterhold and the bending edge of the counter tool on the lower tool. In order to make a bending edge in the workpiece, the upper tool is moved towards the lower tool. Subsequently, by means of the tool body of the upper tool, the counterhold is moved, relative to the bending edge of the counter tool body, in the stroke direction of the upper tool, wherein a pivot movement of the counter tool body is subsequently triggered in a movement-coupled manner, such that a lug of the workpiece is bent around the bending edge of the tool body on the upper tool. As a result, it is possible to form bend angles of greater than 90° in the lug of the workpiece. When the upper tool is moved apart from the lower tool, the pivotable counter tool body is pivoted back, before the upper tool is raised from the counterhold.

A bending tool is furthermore known from EP 0 610 706 A1, in the case of which bending tool a pivot movement of a counter tool body is triggered in order to produce a chamfer of greater than 90°.

A bending tool is furthermore known from EP 0 089 904 B1. In this bending tool, a counter tool body that is fixedly arranged on the main body of the lower tool and comprises a bending edge is known. A counterhold is provided in a stationary manner on the upper tool, and a pivotably arranged tool body is provided adjacently to the counterhold, which tool body is controlled, by means of a cam controller, following clamping of the workpiece, between the counter tool body of the lower tool and the counterhold of the upper tool, by way of a pivot movement, in order to form a bend of greater than 90° in the lug of the workpiece. In order to remove this bend workpiece, it is necessary for a counter pivot movement of the tool body into an initial position to first be triggered in order to raise the upper tool relative to the lower tool.

SUMMARY

One of the objects of the invention is that of proposing a tool that has a simple structure and is suitable for machining chamfers having an angle of greater than 90°. Another object of the invention is that of proposing a machine tool for machining planar workpieces, which machine tool makes it possible to produce undercuts in a workpiece. Furthermore, a further object of the invention is that of proposing a method for machining planar workpieces, which method makes it possible to produce chamfers having an undercut, i.e. a chamfer on a limb of the workpiece having an angle of greater than 90°, in a simple manner.

One aspect of the invention features a tool for machining planar workpieces, in which a bending edge of the tool body of the upper tool is arranged so as to be fixed in position with respect to the main body of the upper tool, and the bending edge of the counter tool body of the lower tool is arranged so as to be fixed in position with respect to the main body of the lower tool, and the bending edge of the upper tool is associated with an undercut on the tool body, and the bending edge of the lower tool is associated with an undercut on the counter tool body. By means of a tool of this kind, the tool body and the counter tool body are arranged so as to be fixed, i.e. not pivotable, on the relevant main body of the upper tool and lower tool, resulting in a simple and cost-effective structure of the tool without any mechanics. The relevant bending edges of the upper and lower tool can be positioned in the relevant undercuts such that for example chamfers are possible in which the chamfered lug can assume a bend angle of greater than 90°.

Preferably, the tool comprises a tool body on the upper tool that comprises a pressure body, and the bending edge is provided on a portion that protrudes opposite the pressure body, such that an undercut is formed between the main body of the upper tool and the bending edge that is arranged on the protruding portion. This allows for a compact design of the tool body. Moreover, high pressure forces can be transmitted.

The counter tool body of the lower tool is preferably designed in a manner analogous to the tool body of the upper tool. Said counter tool body preferably comprises a pressure body, wherein the bending edge is provided on a portion that protrudes opposite the pressure body, such that an undercut is formed between the main body and the bending edge of the counter tool body that is arranged on the protruding portion. This allows for a geometrically simple design of the tool.

The counterhold arranged on the lower tool preferably comprises a counter holding surface that is oriented so as to be parallel to the pressure surface, on the pressure body of the tool body. As a result, the workpiece can be additionally clamped between the counterhold and the tool body prior to a bend or chamfer being made. The workpiece to be machined is preferably oriented and held in position by means of at least one gripping device of the machine tool.

Advantageously, the counter holding surface of the counterhold is oriented in a plane relative to the bending edge of the counter tool body, in an initial position relative to the main body of the lower tool. Alternatively, the counterhold surface can also be raised relative to the bending edge of the counter tool body. In the latter case, a preload can be introduced into the workpiece.

The counter tool body is advantageously arranged so as to be off-center relative to the position axis of the main body of the lower tool, and the counterhold is arranged at a distance from the bending edge of the counter tool body. Larger chamfers can be made as a result. Alternatively, the counter tool body or the bending edge on the counter tool body can also be located in the position axis of the main body of the lower tool.

Furthermore, the bending edge of the tool body may be provided so as to be off-center with respect to the position axis of the main body of the upper tool. An embodiment of this kind is preferably intended to be provided when larger or longer chamfers are intended to be made. In order to achieve an arrangement that is optimized in terms of the pressure force, the bending edge of the tool body is preferably arranged so as to be in the positioning axis.

At least one bending edge is preferably formed on the protruding portion of the tool body, between a pressure surface and a free surface, wherein said pressure surface and the free surface are each oriented so as to be at an angle of 90° or of less than 90° relative to one another, proceeding from the bending edge. A further bending edge, which defines the free surface, is preferably provided on the protruding portion. As a result, a first and a second bending edge adjoin the free surface. An undercut is preferably formed between the further or second bending edge and the tool main body or a scraper arranged therebetween. The advantage of this arrangement is that a stiff protruding portion is formed that first allows for bending of a limb by for example 90°, by means of a first bending edge, and subsequently allows for further bending of the limb by an angle of greater than 90°, by means of the second bending edge, such that it is possible to form a chamfer having an angle of less than 90°. As a result, an undercut, having an angle of less than 90°, is formed between the workpiece and the chamfered limb.

Furthermore, a third bending edge may be provided on the pressure body of the tool body on the upper tool, which third bending edge defines the pressure surface. A third bending edge is thus associated with the first bending edge. A free surface can adjoin this bending edge too, as a result of which an undercut is formed between the bending edge and the tool body, in order to form a bend on the workpiece of less than 90°.

The counter tool body preferably comprises a protruding portion that comprises a rest surface and at least one adjoining free surface. The rest surface is defined by the bending edge. The free surface preferably extends at an angle of 90° or less than 90°, in a manner adjoining the bending edge and oriented towards the rest surface. The counter tool body may also comprise at least one second bending edge which is opposite the first bending edge and defines the rest surface.

Alternatively, the protruding portion on the tool body and/or counter tool body may have a rectangular course when viewed in cross section, with the result that the protruding portion extends in an L-shape, for example proceeding from the pressure body.

It is furthermore preferable for the orientation of the free surface on the tool body and the free surface on the counter tool body to be the same. In addition, the orientation of the free surface, at an angle, on the tool body and counter tool body can also match. Said orientations can also differ from one another, in a manner specific to the application.

The bending edge on the tool body and/or counter tool body can thus be formed as a body edge on the protruding portion, having a specified shaping radius. Alternatively, the bending edge can also be formed by a rotating roll.

According to a further advantageous embodiment of the tool, the counterhold is arranged on the main body of the lower tool so as to be moveable in the direction of the upper face of the lower tool.

The counterhold is preferably insertable in the direction of the main body, counter to at least one restoring element. This is advantageous in that the workpiece can be retained in a clamped manner between the upper tool and the lower tool during the bending process. Bending of the workpiece adjacently to the chamfer is thus reduced.

Another aspect of the invention features a machine tool for machining planar workpieces, preferably metal sheets, in which an upper tool is provided which is moveable along a stroke axis, by means of a stroke drive device, in the direction of a workpiece that is to be machined by the upper tool, and in the counter direction, and which can be positioned along an upper positioning axis that runs perpendicularly to the stroke axis, and is moveable along the upper positioning axis by means of a motor drive assembly. A lower tool is furthermore provided, which is oriented towards the upper tool and can be positioned along a lower positioning axis oriented perpendicularly to the stroke axis of the upper tool, and which is moveable along the lower positioning axis by means of a motor drive assembly. Said machine tool comprises a controller, by means of it is possible to actuate the motor drive assembly for moving the upper and lower tool. In this case, the traversing movement of the upper tool along the upper positioning axis and the traversing movement of the lower tool along the lower positioning axis can each be controlled independently of one another, and a tool according to any of the embodiments described above is used. A chamfer can thus be made in the workpiece in a simple manner. In particular, the chamfer or bend can be made to such an extent that a bend angle of greater than 90° can be made in the workpiece. Said machine tool can thus make undercuts on a lug or chamfers of a workpiece, having a bend angle of greater than 90°, using the above-described tool.

It is advantageously possible for the upper tool and/or the lower tool to be controllable by means of a stroke movement and/or rotary movement about the position axis. The versatility in making the chamfer can thus be further increased.

A further aspect of the invention features a method for machining planar workpieces, in which method a tool according to any of the preceding embodiments is used. The upper tool and/or the lower tool can be controlled at least by means of a stroke movement and a subsequent traversing movement, along at least one positioning axis, in order to make a bend or chamfer on a workpiece, in particular having a bend angle of less than 90°. In the case of a bend angle of less than 90°, an undercut is formed between the workpiece and the bent limb.

According to a first preferred embodiment of the method, in order to produce the chamfer on the limb of the workpiece having a bend angle of less than 90°, the limbs of the workpiece are placed on the counterhold and the bending edge of the counter tool body on the lower tool. The upper tool and/or lower tool are subsequently moved towards one another. In a first bending phase, the bending edge of the upper tool and/or the bending edge of the lower tool are moved past one another, wherein the upper tool and the lower tool are moved along the position axes thereof. The limb of the workpiece is bent, in particular by 90°, between the mutually associated bending edges. In a second bending phase, the upper tool and/or the lower tool are moved along the positioning axes thereof. The positioning axis is oriented perpendicularly to the position axis. As a result, the upper tool and/or lower tool is moved into the relevant undercut of the upper tool and of the lower tool, with respect to the bending edges of said tool, such that bending edge of the counter tool body and the bending edge of the tool body engage behind one another. A bend of the limb by less than 90° is attained thereby. Subsequently, a release movement is controlled after the chamfer has been made.

According to an alternative embodiment of the method for producing the chamfer on the limbs of the workpiece, having an angle of less than 90°, the upper tool and/or lower tool are moved towards one another after the limb of the workpiece have been placed on the counterhold and the bending edge of the counter tool body. Subsequently, the workpiece is held in a clamped manner between the pressure surface of the tool body and the counter holding surface of the counterhold. In the event of a further traversing movement along the stroke direction of the upper and/or lower tool, a first bend is made in the limb, while maintaining the clamping of the workpiece. In a further bending phase, the upper tool and/or lower tool are moved along the position axes thereof until the bending edge of the upper tool and the bending edge of the lower tool engage behind one another. This results in a bend of the limb relative to the workpiece carrier of less than 90°. A further release movement follows, such that the upper tool and/or lower tool is returned into an initial position.

In the case of a counterhold on the lower tool that can perform an insertion movement relative to the main body, automatic resetting preferably takes place by means of at least one restoring element, after the chamfer has been made.

DESCRIPTION OF DRAWINGS

The invention and further advantageous embodiments and developments thereof will be described and explained in greater detail in the following, with reference to the examples shown in the drawings. The features found in the description and the drawings can be applied, according to the invention, individually or together, in any desired combination. In the drawings.

DETAILED DESCRIPTION

Figure 1:
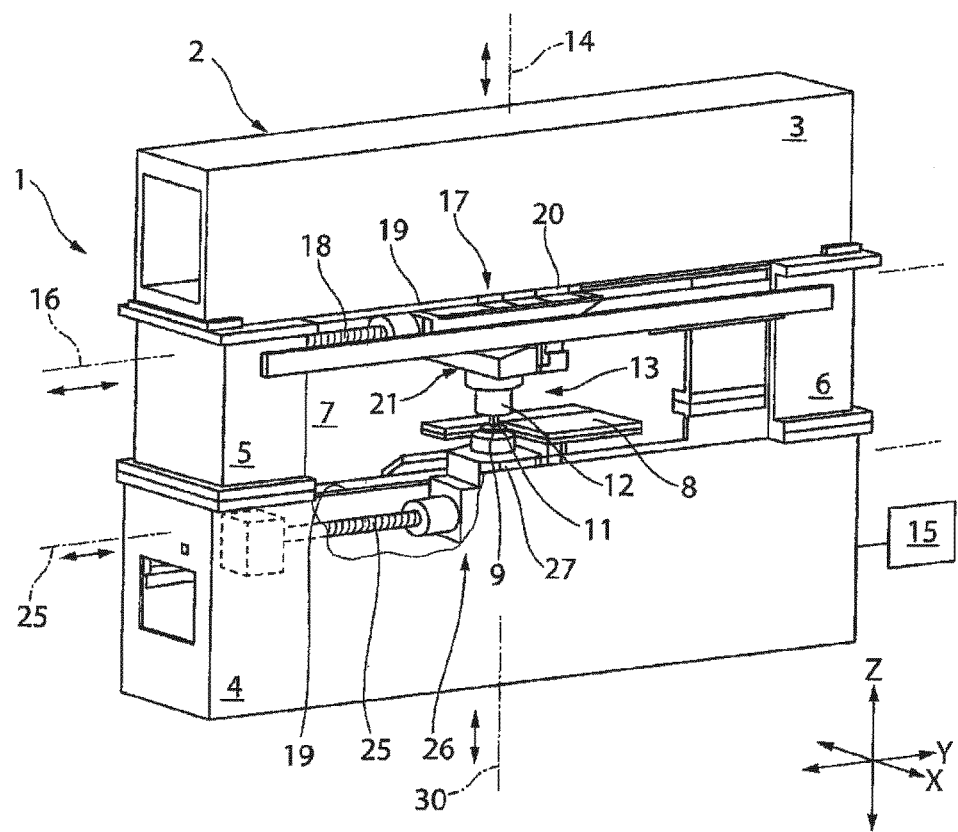
FIG. 1 is a perspective view of the machine tool.

FIG. 1 shows a machine tool 1 which is configured as a punch press. This machine tool 1 comprises a supporting structure with a closed machine frame 2. This comprises two horizontal frame limbs 3, 4 and two vertical frame limbs 5 and 6. The machine frame 2 surrounds a frame interior 7, which forms the working area of the machine tool 1 with an upper tool 11 and a lower tool 9.

The machine tool 1 is used to machine planar workpieces 10, which for the sake of simplicity have not been shown in FIG. 1 and can be arranged in the frame interior 7 for machining purposes. A workpiece 10 to be machined is placed on a workpiece support 8 provided in the frame interior 7. The lower tool 9, for example in the form of a die, is mounted in a recess in the workpiece support 8 on the lower horizontal frame limb 4 of the machine frame 2. This die can be provided with a die opening. In the case of a punching operation the upper tool 11 formed as a punch dips into the die opening of the lower tool formed as a die.

The upper tool 11 and lower tool 9, instead of being formed by a punch and a die for punching, can also be formed by a bending punch and a bending die for shaping workpieces 10.

The upper tool 11 is fixed in a tool receptacle on a lower end of a ram 12. The ram 12 is part of a stroke drive device 13, by means of which the upper tool 11 can be moved in a stroke direction along a stroke axis 14. The stroke axis 14 runs in the direction of the Z axis of the coordinate system of a numerical controller 15 of the machine tool 1 indicated in FIG. 1. The stroke drive device 13 can be moved perpendicular to the stroke axis 14 along a positioning axis 16 in the direction of the double-headed arrow. The positioning axis 16 runs in the direction of the Y axis of the coordinate system of the numerical controller 15. The stroke drive device 13 receiving the upper tool 11 is moved along the positioning axis 16 by means of a motor drive 17.

The movement of the ram 12 along the stroke axis 14 and the positioning of the stroke drive device 13 along the positioning axis 16 are achieved by means of a motor drive 17, which can be configured in the form of a drive assembly 17, in particular a spindle drive assembly, with a drive spindle 18 running in the direction of the positioning axis 16 and fixedly connected to the machine frame 2. The stroke drive device 13, in the event of movements along the positioning axis 16, is guided on three guide rails 19 of the upper frame limb 3, of which two guide rails 19 can be seen in FIG. 1. The other guide rail 19 runs parallel to the visible guide rail 19 and is distanced therefrom in the direction of the X axis of the coordinate system of the numerical controller 15. Guide shoes 20 of the stroke drive device 13 run on the guide rails 19. The mutual engagement of the guide rail 19 and the guide shoe 20 is such that this connection between the guide rails 19 and the guide shoes 20 can also bear a load acting in the vertical direction. The stroke device 13 is mounted on the machine frame 2 accordingly via the guide shoes 20 and the guide rails 19. A further component of the stroke drive device 13 is a wedge gear 21, by means of which the position of the upper tool 11 relative to the lower tool 9 is adjustable.

The lower tool 9 is received moveably along a lower positioning axis 25. This lower positioning axis 25 runs in the direction of the Y axis of the coordinate system of the numerical controller 15. The lower positioning axis 25 is preferably oriented parallel to the upper positioning axis 16. The lower tool 9 can be moved directly on the lower positioning axis 16 by means of a motor drive assembly 26 along the positioning axis 25. Alternatively or additionally the lower tool 9 can also be provided on a stroke drive device 27, which is moveable along the lower positioning axis 25 by means of the motor drive assembly 26. This drive assembly 26 is preferably configured as a spindle drive assembly. The lower stroke drive device 27 can correspond in respect of its structure to the upper stroke drive device 13. The motor drive assembly 26 likewise may correspond to the motor drive assembly 17.

The lower stroke drive device 27 is mounted displaceably on guide rails 19 associated with a lower horizontal frame limb 4. Guide shoes 20 of the stroke drive device 27 run on the guide rails 19, such that the connection between the guide rails 19 and guide shoes 20 at the lower tool 9 can also bear a load acting in the vertical direction. Accordingly, the stroke drive device 27 is also mounted on the machine frame 2 via the guide shoes 20 and the guide rails 19, moreover at a distance from the guide rails 19 and guide shoes 20 of the upper stroke drive device 13. The stroke drive device 27 may also comprise a wedge gear 21, by means of which the position or height of the lower tool 9 along the Z axis is adjustable.

By means of the numerical controller 15, both the motor drives 17 for a traversing movement of the upper tool 11 along the upper positioning axis 16 and the one or more motor drives 26 for a traversing movement of the lower tool 9 along the lower positioning axis 25 can be controlled independently of one another. The upper and lower tools 11, 9 are thus moveable synchronously in the direction of the Y axis of the coordinate system. An independent traversing movement of the upper and lower tools 11, 9 in different directions can also be controlled. This independent traversing movement of the upper and lower tools 11, 9 can be controlled simultaneously. As a result of the decoupling of the traversing movement between the upper tool 11 and the lower tool 9, an increased versatility of the machining of workpieces 10 can be attained. The upper and lower tools 11, 9 can also be configured to machine the workpieces 10 in many ways.

Figure 2:
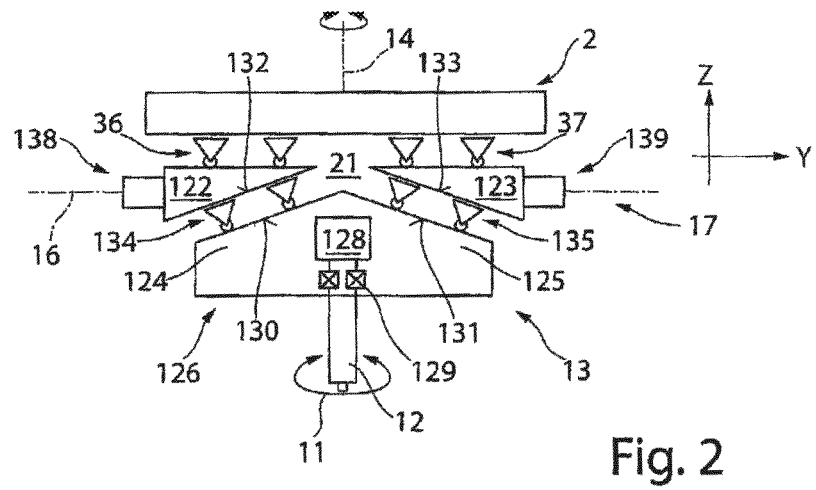
FIG. 2 schematically shows the principle structure of a stroke drive device and a motor drive according to FIG. 1.

One component of the stroke drive device 13 is the wedge gear 21, which is shown in FIG. 2. The wedge gear 21 comprises two drive-side wedge gear elements 122, 123, and two output-side wedge gear elements 124, 125. The latter are combined structurally to form a unit in the form of an output-side double wedge 126. The ram 12 is mounted on the output-side double wedge 126 so as to be rotatable about the stroke axis 14. A motor rotary drive device 128 is accommodated in the output-side double wedge 126 and advances the ram 12 about the stroke axis 14 as necessary. Here, both a left-handed and a right-handed rotation of the ram 12 in accordance with the double-headed arrow in FIG. 2 are possible. A ram mounting 129 is shown schematically. On the one hand, the ram mounting 129 allows low-friction rotary movements of the ram 12 about the stroke axis 14, and on the other hand the ram mounting 129 supports the ram 12 in the axial direction and accordingly dissipates loads that act on the ram 12 in the direction of the stroke axis 14 in the output-side double wedge 126.

The output-side double wedge 126 is defined by a wedge surface 130, and by a wedge surface 131 of the output-side gear element 125. Wedge surfaces 132, 133 of the drive-side wedge gear elements 122, 123 are arranged opposite the wedge surfaces 130, 131 of the output-side wedge gear elements 124, 125. By means of longitudinal guides 134, 135, the drive-side wedge gear element 122 and the output-side wedge gear element 124, and also the drive-side wedge gear element 123 and the output-side wedge gear element 125, are guided moveably relative to one another in the direction of the Y axis, that is to say in the direction of the positioning axis 16 of the stroke drive device 13.

The drive-side wedge gear element 122 has a motor drive unit 138, and the drive-side wedge gear element 123 has a motor drive unit 139. Both drive units 138, 139 together form the spindle drive assembly 17.

The drive spindle 18 shown in FIG. 1 is common to the motor drive units 138, 139, as is the stroke drive device 13, 27 that is mounted on the machine frame 2 and consequently on the supporting structure.

The drive-side wedge gear elements 122, 123 are operated by the motor drive units 138, 139 in such a way that said wedge gear elements move, for example, towards one another along the positioning axis 16, whereby a relative movement is performed between the drive-side wedge gear elements 122, 123 on the one hand and the output-side wedge gear elements 124, 125 on the other hand. As a result of this relative movement, the output-side double wedge 126 and the ram 12 mounted thereon is moved downwardly along the stroke axis 14. The punch mounted on the ram 12 for example as the upper tool 11 performs a working stroke and in so doing machines a workpiece 10 mounted on the workpiece rest 28, 29 or the workpiece support 8. By means of an opposite movement of the drive wedge elements 122, 123, the ram 12 is in turn raised or moved upwardly along the stroke axis 14.

The above-described stroke drive device 13 according to FIG. 2 is preferably of the same design as the lower stroke drive device 27 and receives the lower tool 9.

Figure 3:
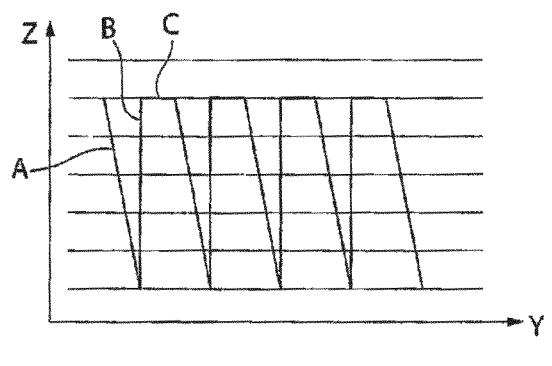
FIG. 3 is a schematic graph showing a superposed stroke movement, in the Y- and Z-direction, of the ram according to FIG. 1.

FIG. 3 shows a schematic graph of a possible stroke movement of the ram 12. The graph shows a stroke profile along the Y axis and the Z axis. By means of a superposed control of a traversing movement of the ram 12 along the stroke axis 14 and along the positioning axis 16, an obliquely running stroke movement of the stroke ram 12 downwardly towards the workpiece 10 can, for example, be controlled, as shown by the first straight line A. Once the stroke has been performed, the ram 12 can then be lifted vertically, for example, as illustrated by the straight line B. For example, an exclusive traversing movement along the Y axis is then performed in accordance with the straight line C, in order to position the ram 12 for a new working position relative to the workpiece 10. For example, the previously described working sequence can then be repeated. If the workpiece 10 is moved on the workpiece rest surface 28, 29 for a subsequent machining step, a traversing movement along the straight line C may also be omitted.

The possible stroke movement of the ram 12 on the upper tool 11 shown in the graph in FIG. 3 is preferably combined with a lower tool 9 that is held stationary. Here, the lower tool 9 is positioned within the machine frame 2 in such a way that, at the end of a working stroke of the upper tool 11, the upper and lower tools 11, 9 assume a defined position.

This exemplary, superposed stroke profile can be controlled for both the upper tool 11 and the lower tool 9. Depending on the machining of the workpiece 10 that is to be performed, a superposed stroke movement of the upper tool and/or lower tool 11, 9 can be controlled.

Figure 4:
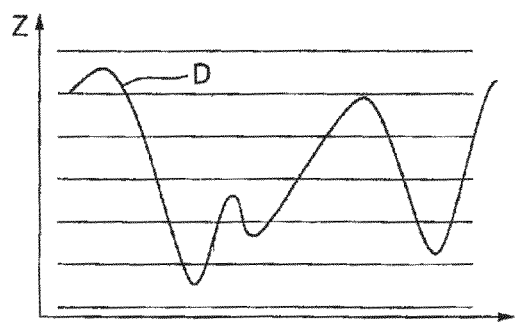
FIG. 4 is a schematic graph showing a further superposed stroke movement, in the Y- and Z-direction, of the ram according to FIG. 1.

FIG. 4 shows a schematic graph illustrating a stroke movement of the ram 12 in accordance with the line D, shown by way of example, along a Y axis and a Z axis. In contrast to FIG. 3, it is provided in this exemplary embodiment that a stroke movement of the ram 12 can pass through a curve profile or arc profile by controlling a superposition of the traversing movements in the Y direction and Z direction appropriately by the controller 15. By means of a versatile superposition of this kind of the traversing movements in the X direction and Z direction, specific machining tasks can be performed. The control of a curve profile of this kind can be provided for the upper tool 11 and/or the lower tool 9.

Figure 5:
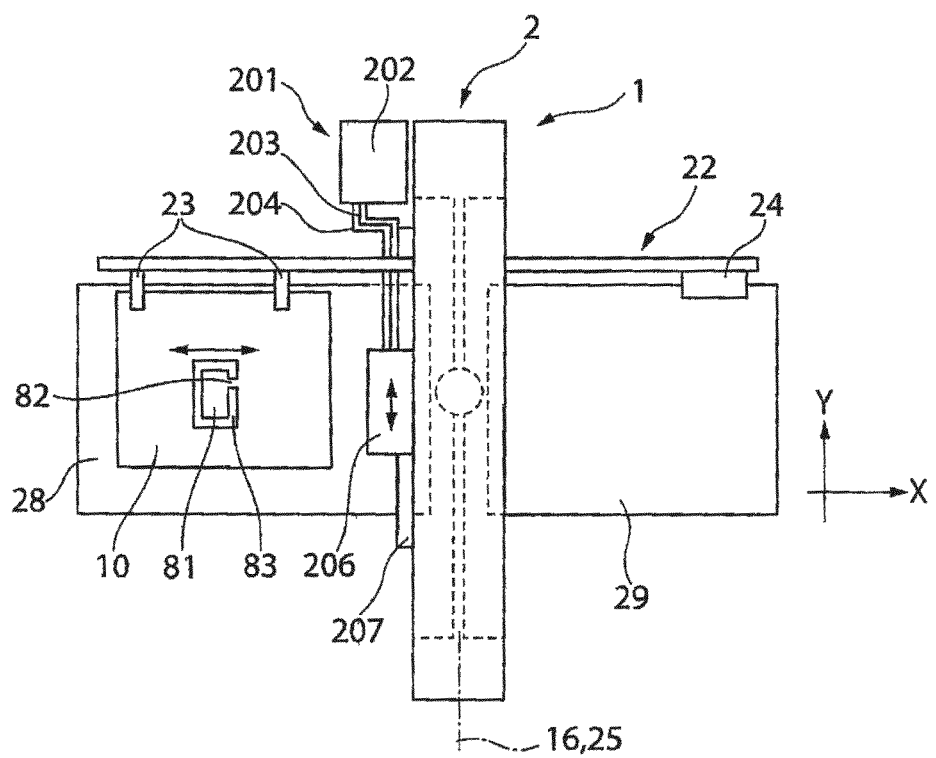
FIG. 5 is a schematic view from above of the machine tool according to FIG. 1 comprising workpiece rest surfaces.

FIG. 5 shows a schematic view of the machine tool 1 according to FIG. 1. Workpiece rests 28, 29 extend laterally in one direction each on the machine frame 2 of the machine tool 1. The workpiece rest 28 can, for example, be associated with a loading station (not shown in greater detail), by means of which unmachined workpieces 10 are placed on the workpiece rest 28. A feed device 22 is provided adjacently to the workpiece rest 28, 29 and comprises a plurality of grippers 23 in order to grip the workpiece 10 placed on the workpiece rest 28. The workpiece 10 is guided through the machine frame 2 in the X direction by means of the feed device 22. The feed device 22 may also preferably be controlled so as to be moveable in the Y direction. A free traversing movement of the workpiece 10 in the X-Y plane may thus be provided. Depending on the work task, the workpiece 10 may be moveable by the feed device 22 both in the X direction and against the X direction. This movement of the workpiece 10 can be adapted to a movement of the upper tool 11 and lower tool 9 in and against the Y direction for the machining work task at hand.

The further workpiece rest 29 is provided on the machine frame 2 opposite the workpiece rest 28. This further workpiece rest can be associated, for example, with an unloading station. Alternatively, the loading of the unmachined workpiece 10 and unloading of the machined workpiece 10 having workpieces 81 can also be associated with the same workpiece rest 28, 29.

The machine tool 1 may furthermore comprise a laser machining device 201, in particular a laser cutting machine, which is shown merely schematically in a plan view in FIG. 5. This laser machining device 201 may be configured, for example, as a CO2 laser cutting machine. The laser machining device 201 comprises a laser source 202, which generates a laser beam 203, which is guided by means of a beam guide 204 (shown schematically) to a laser machining head, in particular laser cutting head 206, and is focused therein. The laser beam 204 is then oriented perpendicularly to the surface of the workpiece 10 by a cutting nozzle in order to machine the workpiece 10. The laser beam 203 acts on the workpiece 10 at the machining location, in particular cutting location, preferably jointly with a process gas beam. The cutting point, at which the laser beam 203 impinges on the workpiece 10, is adjacent to the machining point of the upper tool 11 and lower tool 9.

The laser cutting head 206 is moveable by a linear drive 207 having a linear axis system at least in the Y direction, preferably in the Y and Z direction. This linear axis system, which receives the laser cutting head 206, can be associated with the machine frame 2, fixed thereto or integrated therein. A beam passage opening can be provided in the workpiece rest 28 below a working space of the laser cutting head 206. A beam capture device for the laser beam 21 may be provided preferably beneath the beam passage opening 210. The beam passage opening and as applicable the beam capture device can also be configured as one unit.

The laser machining device 201 may alternatively also comprise a solid-state laser as laser source 202, the radiation of which is guided to the laser cutting head 206 with the aid of a fiber-optic cable.

The workpiece rest 28, 29 may extend directly as far as the workpiece support 8 which surrounds the lower tool 9 at least in part. Within a resultant free space created therebetween, the lower tool 9 is moveable along the lower positioning axis 25 in and against the Y direction.

For example, a machined workpiece 10 lies on the workpiece rest 28, in which workpiece a workpiece part 81 is cut free, apart from a remaining connection 82, by a cutting gap 83, for example by means of a punching operation or by laser beam machining. The workpiece 81 is held in the workpiece 10 or the remaining residual lattice by means of this remaining connection. In order to separate the workpiece part 81 from the workpiece 10, the workpiece 10 is positioned by means of the feed device 22 relative to the upper and lower tool 11, 9 for a cutting and discharge step. In this case, the remaining connection 82 is separated by a punching stroke of the upper tool 11 relative to the lower tool 9. The workpiece part 81 can, for example, be discharged downwardly by partially lowering of the workpiece support 8. Alternatively, in the case of larger workpiece parts 81, the cut-free workpiece part 81 can be transferred back again to the workpiece rest 28 or to the workpiece rest 29 in order to unload the workpiece part 81 and the residual lattice. Small workpiece parts 81 may also optionally be discharged through an opening in the lower tool 9.

Figure 6:
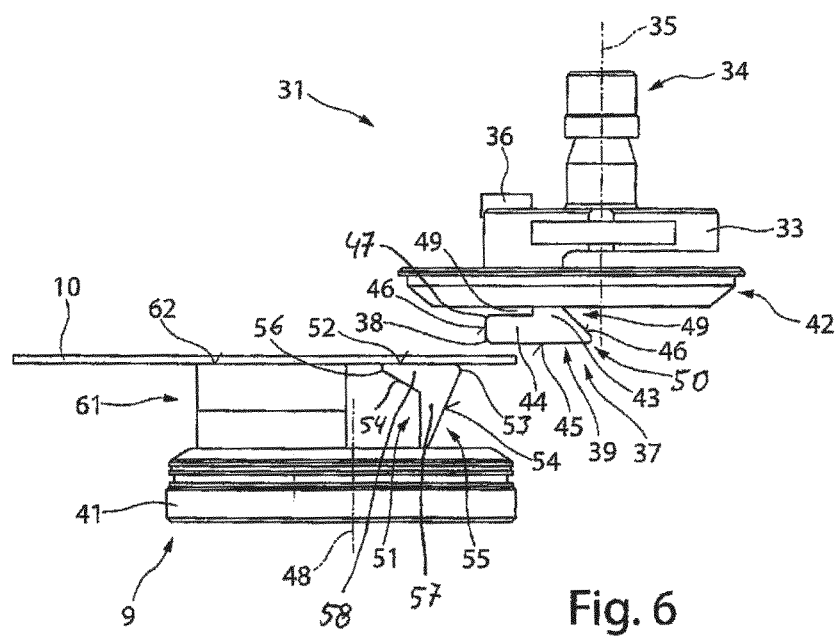
FIG. 6 is a schematic side view of a first embodiment of a tool comprising an upper tool and a lower tool, in an initial position.

FIG. 6 is a schematic side view of a first embodiment of the tool 31. This tool 31 is preferably configured as a bending tool. The tool 31 comprises an upper tool 11 and a lower tool 9. The upper tool 11 comprises a main body 33 on which a clamping shaft 34 is arranged. Said shaft may be arranged in the tool receptacle of the machine tool 1 so as to be rotatable about a position axis 35. Furthermore, an indexing wedge 36 may be provided on the main body 33, in order to align a tool body 39 provided on the main body 33. The tool body 39 is provided opposite the clamping shaft 34, on the main body 33. Said tool body comprises at least one bending edge 38 on the free outer end, from which a pressure surface 45 extends. A scraper 42 may be associated with the main body 33.

The tool body 39 comprises a pressure body 43 on which the bending edge 38 is provided. The bending edge 38 is arranged opposite the pressure body 43, on a protruding portion 44. The pressure surface 45 and a free surface 46 are provided adjacently to the bending edge 38. In a first embodiment of the tool body 39, the pressure surface 45 and the free surface 46 are arranged at a right angle for example. The bending edge 38 is provided therebetween. Said tool body 39 has an L-shaped contour. The pressure body 43 transitions into a web-like portion that forms the protruding portion 44. The width of the tool body 39 or the length of the bending edge 38 may be designed in a use-specific manner, for introducing a chamber into the workpiece 10.

A second bending edge 47 is preferably formed in said tool body 39 shown in FIG. 6. The free surface 46 is located between the first and second bending edge 38, 47. Said free surface is defined thereby. A third bending edge 50 may be provided opposite said first bending edge 38. Said third bending edge is preferably oriented so as to be rotated by 180° relative to the first bending edge 38. A protruding portion 44 is also formed between the pressure surface 45 and the free surface 46 associated with the third bending edge 50, wherein the free surface 46 associated with the bending edge 50 is arranged at an angle of less than 90° relative to the pressure surface 45.

An undercut 49 is formed in each case between the second bending edge 47 and the main body 33 and between the third bending edge 50 and the main body 33, the functionality of which will be explained more below, with reference to the following work steps.

The tool 31 further comprises an upper tool 11 opposite the lower tool 9. Said lower tool 9 comprises a main body 41. A counter tool body 51 is formed on the main body 41. Said counter tool body 51 comprises a pressure body 57 having at least one protruding portion 58. A rest surface 52 is provided on the pressure body 57, which rest surface protrudes, relative to the main body 41, in the direction of the upper tool 11. The rest surface 52 is defined by a bending edge 53. A free surface 54 adjoins said bending edge 53. Said free surface 54 is provided so as to be at an angle of less than 90° relative to the rest surface 52. As a result, an undercut 55 is formed between the bending edge 53 of the counter tool body 51 and the main body 41.

In said tool 31, the first bending edge 38 is for example formed so as to be off-center relative to the position axis 35 of the upper tool 11. The third bending edge 50 is preferably provided in the position axis 35.

The bending edge 53 of the counter tool body 51 is preferably provided outside a position axis 48 of the lower tool 9. The counter tool body 51 may also comprise a second bending edge 56 that is oriented so as to face the position axis 48 or so as to face the counterhold 61 and is located at a distance therefrom, or in the position axis 48.

A counterhold 61 is furthermore provided on the main body 41, which counterhold in turn comprises a support surface 62. The workpiece 10 rests on said support surface. The support surface 62 and the rest surface 52 are preferably located in a common plane. Alternatively, the support surface can 62 also be raised relative to the rest surface 52.

In order to make a chamfer 64 on a workpiece 10, which chamfer has a bend angle of less than 90°, the following workflow is preferably provided:

The bending edge 38 used on the tool body 39 of the upper tool 11, and the bending edge 53 of the counter tool body 41 on the lower tool 9, are oriented so as to face towards one another. In this respect, a rotary movement or traversing movement of the upper tool and/or of the lower tool 11, 9 can be controlled. An initial position according to FIG. 6 is controlled thereby. At the same time, the mutually opposing bending edges 38, 53 are distanced from or oriented relative to one another, in a manner dependent on the thickness of the workpiece 12.

Figure 7:
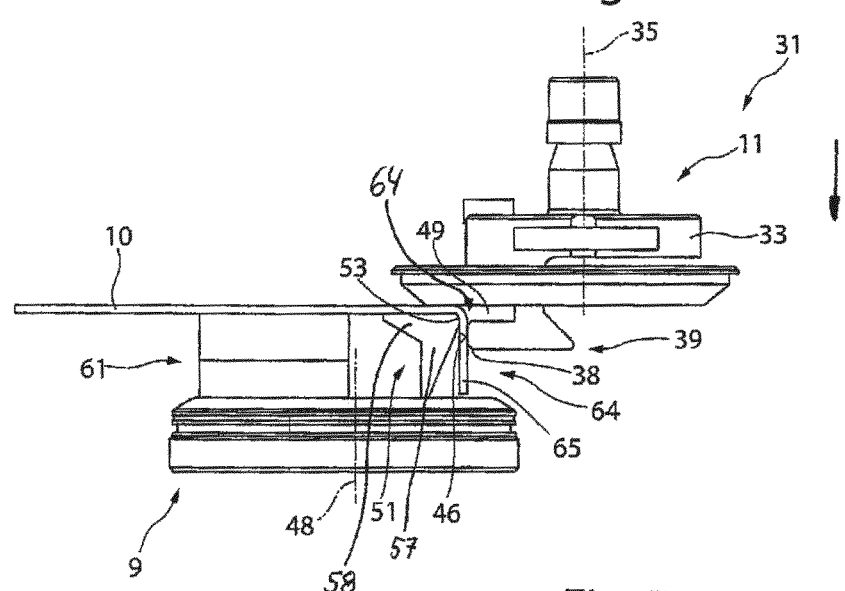
FIG. 7 is a schematic side view of the tool according to FIG. 6, after a first bending phase.

In a first working phase that is show in FIG. 7, for example the upper tool 11 is moved towards the lower tool 9. Alternatively, the lower tool 9 can also be moved towards the upper tool 11. A relative movement of the upper tool 11 and of the lower tool towards one another is also possible. The first bending edge 38 on the upper tool 11 is moved past the first bending edge 53 of the lower tool 9. This results in the formation of a first chamfer 64 of a limb 65 about 90° along the bending edge 53 on the lower tool 9. A scraper 42 which may optionally be provided on the upper tool 11 is already positioned on the workpiece 10 before a first stroke movement of the upper tool 11 and/or of the lower tool 9. This is advantageous in that uncontrolled sagging of the workpiece 10 during the bending process can be prevented. A first bending phase is completed following the chamfering of a limb about 90°.

Figure 8:
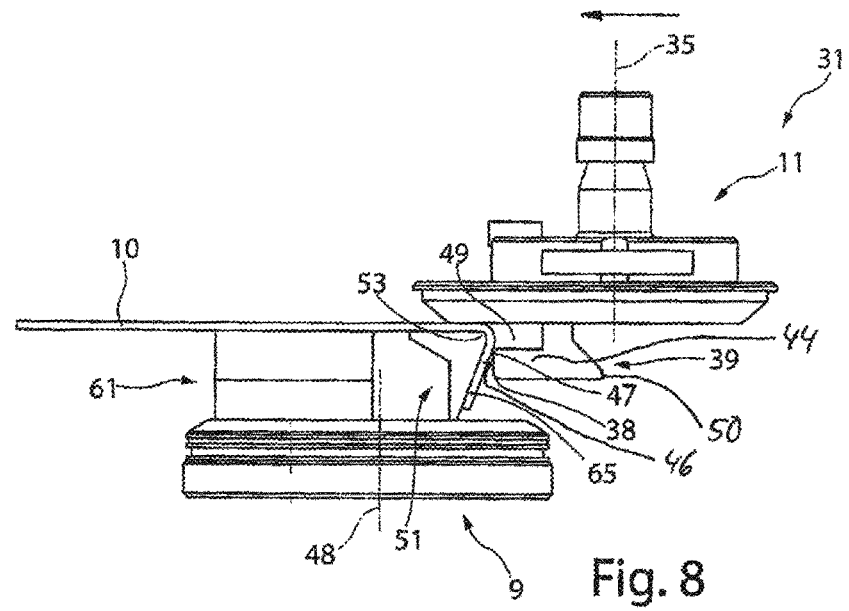
FIG. 8 is a schematic side view of the tool according to FIG. 6, after a second bending phase.

Subsequently, a second bending phase is initiated. The end of the second bending phase is shown in FIG. 8. In this second bending phase, the lower tool 9 and/or the upper tool 11 can be controlled with a traversing movement along the positioning axes 16, 25 thereof. Subsequently, the limb 65 is transferred so as to adjoin the free surface 54 of the counter tool body 51. The chamfer 64 has a bend angle of less than 90°. The formation of an undercut 49 between the tool body 39 and the main body 33 on the upper tool 11 makes it possible for a chamfer of greater than 90° to be made in the limb 65. The protruding portion 44 preferably comprises a further bending edge 47 (FIG. 8) that is parallel to the first bending edge 38 and defines the free surface 46, which further bending edge is used in this embodiment.

After the chamfer 64 has been made, a release movement is controlled between the upper tool 11 and/or lower tool 9.

Figure 9:
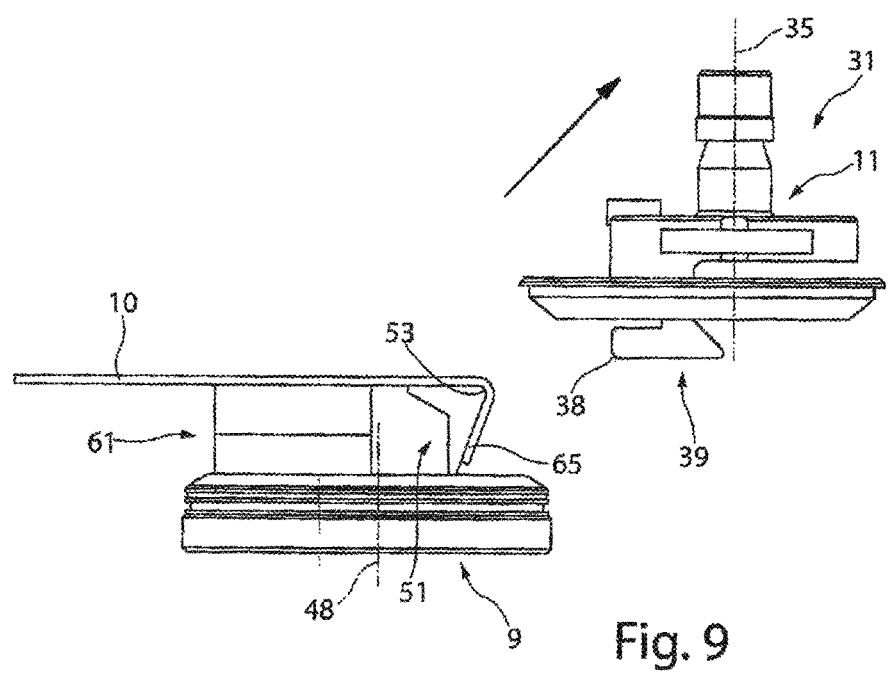
FIG. 9 is a schematic side view of the tool according to FIG. 6, showing a release movement by means of the upper tool.

FIG. 9 shows a first release movement. In this release movement, the upper tool 11 is controlled both by a traversing movement along the upper position axis 16 and along the upper position axis 35, allowing for a superposed traversing movement in the Y- and Z-direction. In this case, the lower tool 9 can remain positioned so as to be at rest.

Alternatively, a release movement can be controlled in that the lower tool 9 comprising the workpiece 10 is moved along the lower positioning axis 25 and the lower position axis 48, such that a superposed traversing movement in the Y- and Z-direction of the lower tool 9 can take place.

Figure 10:
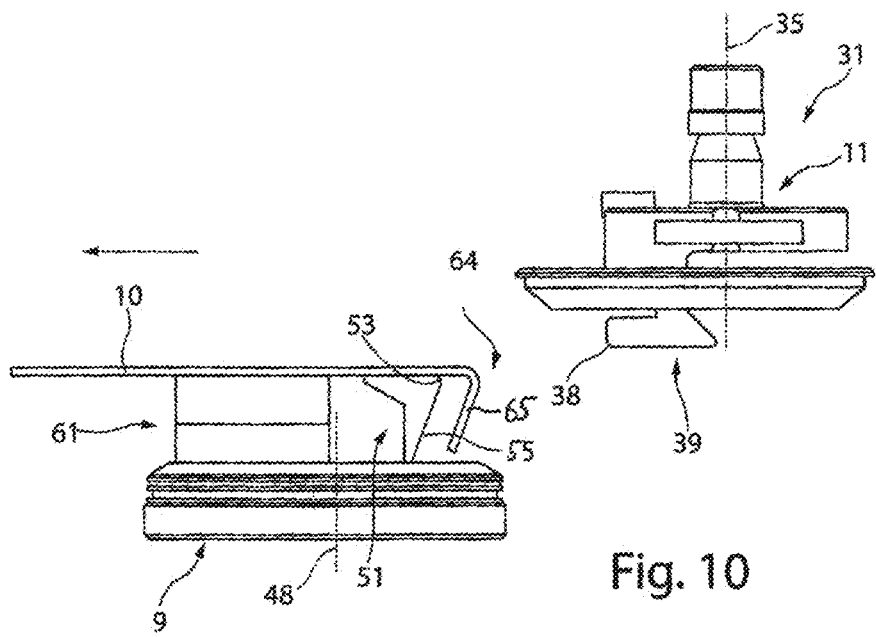
FIG. 10 is a schematic side view of the tool according to FIG. 6, showing a first release movement of the lower tool.

FIG. 10 shows a further alternative release movement compared with FIG. 9. In this embodiment, only the lower tool 9 is moved along the lower positioning axis 25, such that said lower tool moves away from the upper tool 11. At the same time, the chamfer 64 of the workpiece 10 can be released from the counter tool body 51 and come free relative to the undercut 55. It is alternatively also possible for only the upper tool 11 to be moved along the upper positioning axis 16. Likewise, the upper tool 11 and lower tool 9 can be moved simultaneously, in opposite directions, along the positioning axes 16, 25 thereof.

Figure 11:
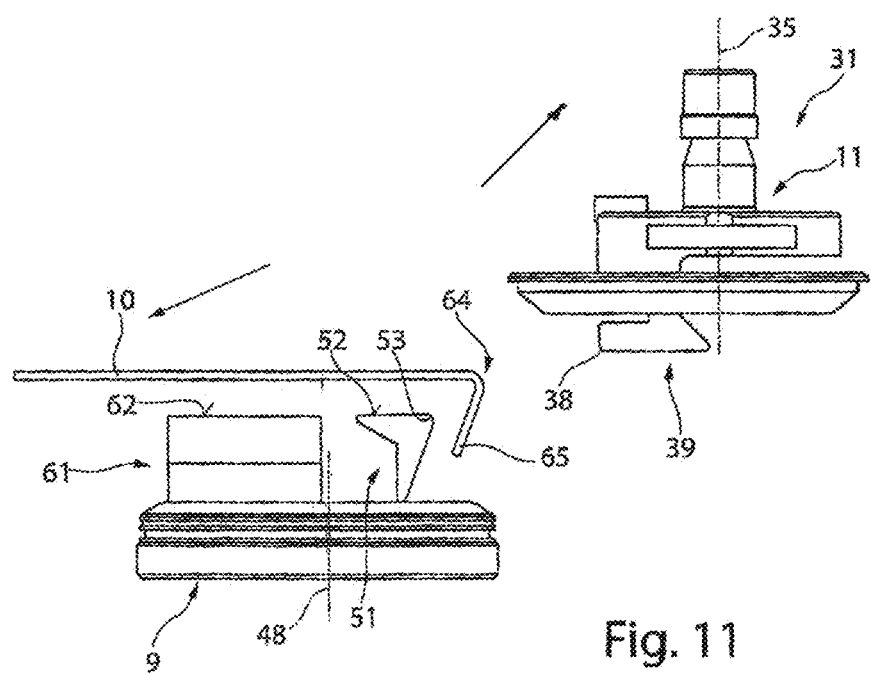
FIG. 11 is a schematic side view of the tool according to FIG. 6, showing an alternative release movement of the lower tool.

FIG. 11 shows a further alternative embodiment of the release movement compared with FIGS. 9 and 11. In this embodiment, the lower tool 9 is moved away from the upper tool 11 by means of superposition of a traversing movement along the Y-axis and the Z-axis. Furthermore, the upper tool 11 is controlled by means of superposition of a traversing movement along the Y-axis and the Z-axis, such that both the upper tool 11 and the lower tool 9 are moved away from one another. The workpiece 10 can subsequently be removed. The release can take place in a superposed manner. A combination of all the variants is also possible.

In the case of the tool body 31 shown in FIGS. 6 to 11, in particular the tool body 39 of the upper tool 11, the second bending edge 48 can also be used for making a chamfer. For this purpose, only the upper tool 11 is pivoted about the position axis 35 by 180°. Subsequently, the work steps shown in FIGS. 6 to 11 can be performed in an analogous manner.

The tool 31 shown in FIGS. 6 to 11 can also be used in the manner as is described in the following FIGS. 12 to 18, with reference to an alternative embodiment of the tool 31.

Figure 12:
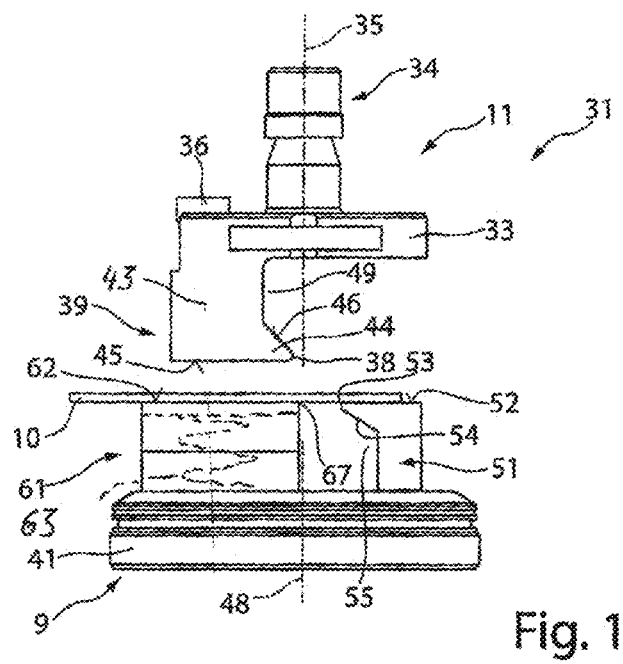
FIG. 12 is a schematic side view of an alternative embodiment of the tool compared with FIG. 6.
Figure 13:
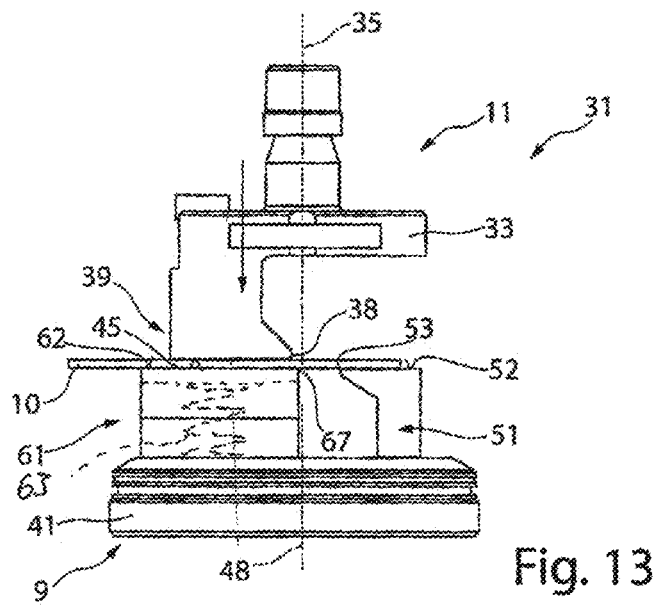
FIG. 13 is a schematic side view of the tool according to FIG. 12, in a first working phase.

The tool 31 in FIG. 12 likewise comprises an upper tool 11 and a lower tool 9. The upper tool 11 differs from the upper tool 11 according to FIG. 6 in that no scraper 42 is provided. Said scraper can likewise optionally be applied. Furthermore, the geometry and design of the tool body 39 also differ. The fundamental structure of the tool 10 is the same, however. Said tool body 39 according to the upper tool 11 in FIG. 12 comprises a pressure body 43 that comprises a pressure surface 45. The bending edge 38 is formed on a protruding portion 44. The pressure surface 45 transitions into the bending edge 38, from which the free surface 43 extends. For example, the free surface 43 and the pressure surface 43 are provided so as to be at an angle of less than 90°. The bending edge 38 is advantageously located in the position axis 35 of the upper tool 11. The undercut 49 is formed between the bending edge 38 and the main body 33.

The lower tool 9 has a structure that is analogous to that of the lower tool 9 according to FIG. 6. The counter tool body 51 for example comprises just one bending edge 53 that is oriented in the direction of the counterhold 61. The counterhold 61 comprises the counter holding surface 62. In this embodiment of the lower tool 9, in the event of pressure application of the upper tool 11 on the counterhold 61, said counterhold can be inserted into the main body 41. The counter holding surface 62 of the counterhold 61 can be returned into an initial position again by means of a restoring element 63. In this initial position, the counter holding surface 62 is positioned in the same plane as the rest surface 52 of the counter tool body 51 or is raised relative thereto.

In order to make a chamfer 64, the upper tool 11 is oriented and positioned relative to the lower tool 9, as shown in FIG. 12 for example. The bending edge 38 of the tool body 39 on the upper tool 11 is oriented towards the counterhold 61, such that an end edge 67 of the counterhold 61 that is oriented towards the bending edge 53 is opposite the bending edge 38. The workpiece 10 rests on the counterhold 61 and the counter tool body 51. The limb 55 provided for the chamfer 64 is oriented towards the bending edge 53, with respect to the desired length thereof, for the chamfer 64.

Figure 14:
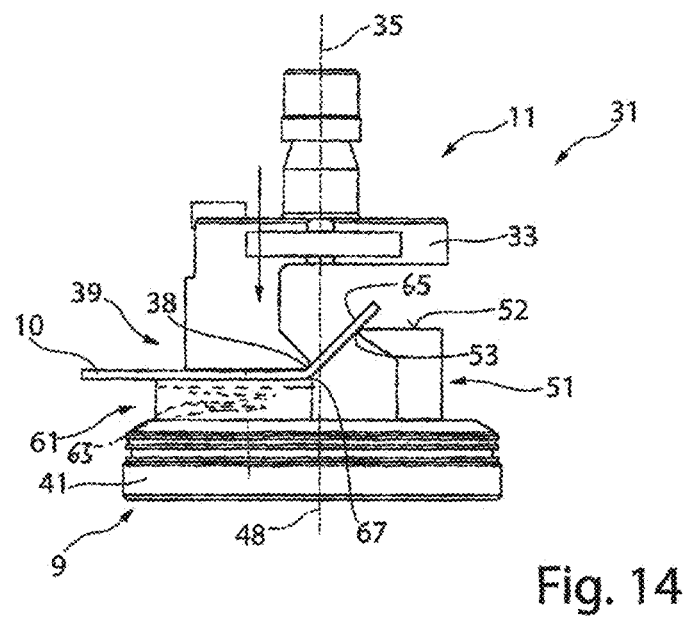
FIG. 14 is a schematic view of the tool according to FIG. 12, in a further working phase.
Figure 15:
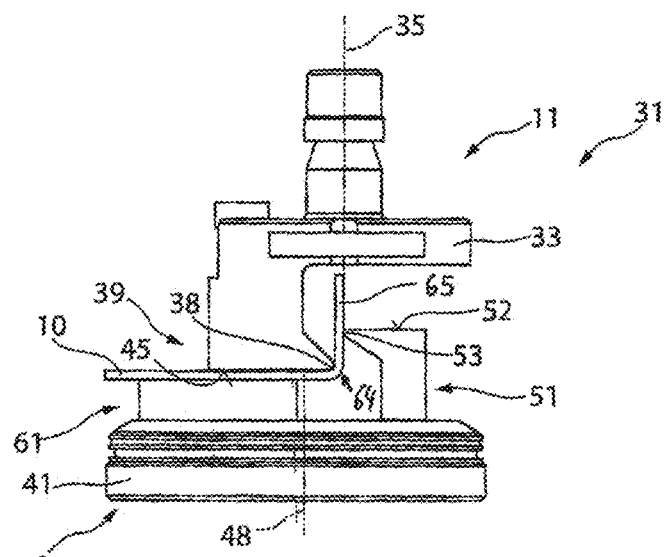
FIG. 15 is a schematic side view of the tool according to FIG. 12, after a first bending phase.
Figure 16:
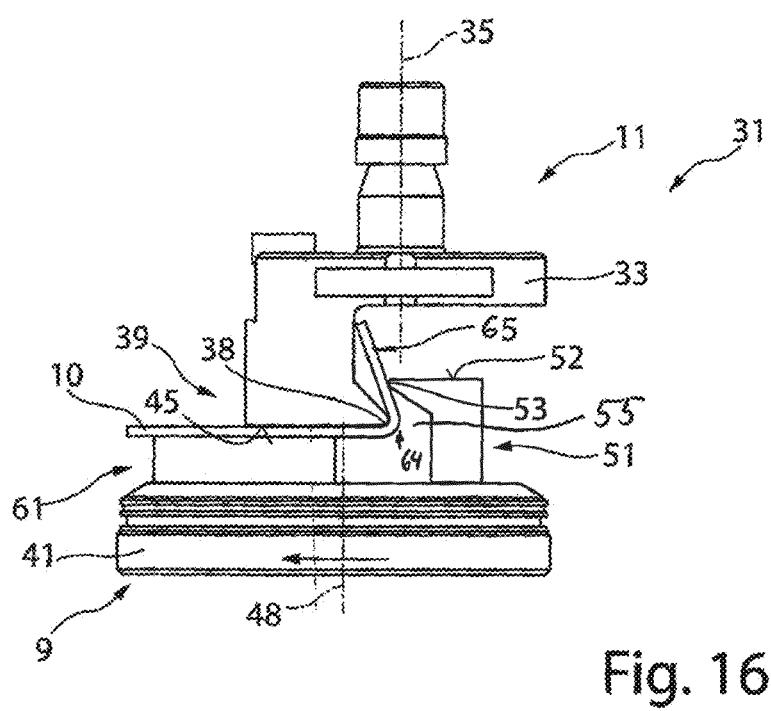
FIG. 16 is a schematic side view of the tool according to FIG. 12, after a second bending phase.

Proceeding from a first working position according to FIG. 12, a stroke movement of the upper tool 11 in the direction of the lower tool 9 is performed. Alternatively, the stroke movement can be performed exclusively by the lower tool 9. Likewise, a combination of a traversing movement of the upper tool 11 and lower tool 9 is possible. The pressure surface 45 initially rests on the workpiece 10. Subsequently, the workpiece 10 is held in a clamped manner between the pressure surface 45 of the tool body 39 of the upper tool 11 and the counter holding surface 62 of the counterhold 61. In a first bending phase, the upper tool 11 is moved further in the direction of the lower tool 9, i.e. in particular moved along the position axis 35. The counterhold 61 is inserted into the main body 41 of the lower tool 9. The clamping of the workpiece 10 continues to be maintained. This is shown in FIG. 14 for example. Said stroke movement is performed until the bending edge 38 of the tool body 39 reaches below the bending edge 53 of the counter tool body 51, such that the relevant bending edges 38, 53 can enter the relevant undercuts 49, 55 during a further traversing movement. Subsequently, a traversing movement of the upper tool 11 and/or of the lower tool 9 along the position axes 16, 25 thereof is initiated. This is shown in FIG. 15. In this case, the limb 65 is first bent by 90°, as is shown in FIG. 15. During a further traversing movement of the upper tool 11 and/or lower tool 9 towards one another, along the positioning axes thereof, the position of the upper tool 11 relative to the lower tool 9 according to FIG. 16 is assumed. The chamfer 64 then has a bend angle of less than 90°.

Figure 17:
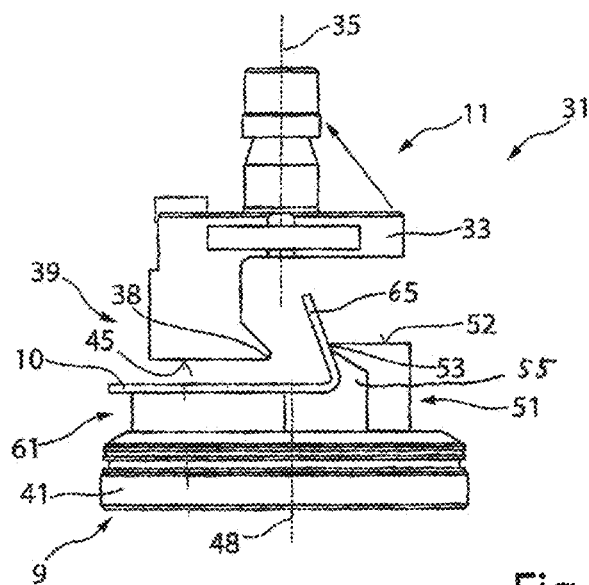
FIG. 17 is a schematic side view of the tool according to FIG. 12, after a first release movement of the upper tool.
Figure 18:
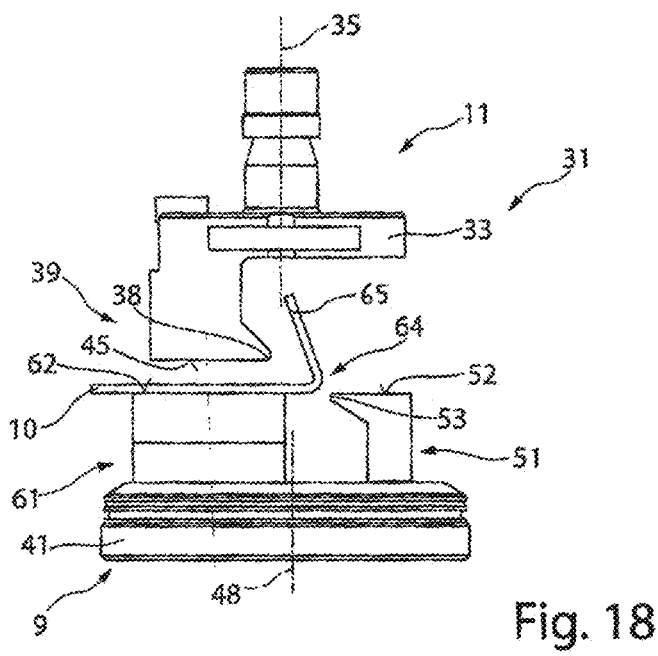
FIG. 18 is a schematic side view of the tool according to FIG. 12, after a further release movement of the upper tool from the lower tool.

Subsequently, a release movement of the tool 31 is controlled. For example, a first release movement can be performed in that the upper tool 11 is moved in a travel direction in the Y- and Z-direction, as is shown in FIG. 17. Alternatively, the lower tool 9 can also be moved in a Y- and Z-direction, so as to be released with respect to the upper tool 11. After the release movement, the counterhold 61 returns to the initial position, as is shown in FIG. 18. Subsequently, the workpiece 10 can be removed from the machine tool 1 or positioned for a further machining step.

The operating principle described above, according to FIGS. 12 to 18, can also be performed by the tool 31 shown in FIGS. 6 to 11. In this case, the lower tool 9 would likewise be designed having an insertable counterhold 61. In this case, the bending edge 48 of the tool body 39, located in the position axis 35, and the bending edge 56 of the counter tool body 51 according to FIG. 6 are preferably used.

What is claimed is:

1. A planar workpiece machining device, comprising:
   an upper tool comprising:
     a clamping shaft,
     an upper main body, and
     an upper tool body arranged on the upper main body to be opposite the clamping shaft and having an upper bending edge; and
   a lower tool comprising:
     a lower main body, and
     a lower tool body arranged on the lower main body and counter to the upper tool body, the lower tool body comprising a counter tool body having a lower bending edge and a counterhold provided on the lower main body, wherein the counter tool body is spaced from the counterhold on the lower main body, and the lower bending edge of the counter tool body is oriented to face in a direction of the counterhold,
   wherein the upper tool and the lower tool are moveable towards one another to machine a workpiece arranged therebetween,
   wherein the upper bending edge of the upper tool body is provided to be stationary relative to the upper main body of the upper tool, and the lower bending edge of the lower tool body is provided to be stationary relative to the lower main body of the lower tool,
   wherein the upper bending edge of the upper tool is associated with an upper undercut on the upper tool body, and the lower bending edge on the lower tool is associated with a lower undercut on the lower tool body,
   wherein the upper tool body comprises a pressure surface, and the upper bending edge is formed on a protruding portion of the upper tool body, wherein the pressure surface transitions into the upper bending edge, from which a free surface of the upper tool body extends,
   wherein the counterhold of the lower tool body is counter to at least one restoring element and is insertable into the lower main body along a first direction parallel to a position axis of the upper tool, and wherein the counterhold is stationary relative to the lower main body along a second direction perpendicular to the first direction, and the counter tool body is stationary relative to the lower main body along the first direction and the second direction, and
   wherein the pressure surface and the free surface are oriented to be at an angle of less than 90°, such that the workpiece on which the pressure surface initially rests is subsequently clamped between the pressure surface and a counter holding surface of the counterhold, and is continuously bent around the upper bending edge towards the free surface of the upper tool body to form a chamfer having a bend angle of less than 90° by i) first moving the upper tool body along the first direction to press the counterhold into the lower main body until the upper bending edge of the upper tool body reaches below the lower bending edge of the counter tool body, and ii) then moving the lower tool body along the second direction to make the lower bending edge of the counter tool body push against a portion of the workpiece to bend around the upper bending edge.

2. The planar workpiece machining device of claim 1, wherein the upper tool body comprises an upper pressure body having the pressure surface, and the upper bending edge is provided on the protruding portion of the upper tool body that protrudes relative to the upper pressure body, such that the upper undercut is formed between the upper main body and the upper bending edge arranged on the protruding portion of the upper tool body.

3. The planar workpiece machining device of claim 1, wherein the lower tool body comprises a lower pressure body and the lower bending edge is provided on a portion of the lower tool body that protrudes relative to the lower pressure body, such that the lower undercut is formed between the lower main body and the lower bending edge arranged on the protruding portion of the lower tool body, and
wherein the protruding portion of the lower tool body is formed by a rest surface and at least one free surface that extend from the lower bending edge of the lower tool body and are oriented to be at an angle of no more than 90° relative to one another.

4. The planar workpiece machining device of claim 1, wherein the counterhold comprises a counter holding surface oriented to be parallel to the pressure surface of the upper tool body of the upper tool.

5. The planar workpiece machining device of claim 4, wherein the counter holding surface of the counterhold is located in a plane relative to the lower bending edge of the lower tool body of the lower tool, in an initial position relative to the lower main body of the lower tool.

6. The planar workpiece machining device of claim 1, wherein the lower tool body is arranged to be off-center relative to a position axis of the lower main body of the lower tool, and
wherein the counterhold is arranged, at a distance from the lower bending edge of the lower tool body, on the lower main body of the lower tool.

7. The planar workpiece machining device of claim 1, wherein the upper bending edge of the upper tool body is provided to be off-center relative to the position axis of the upper tool.

8. The planar workpiece machining device of claim 1, wherein a further bending edge is provided on the protruding portion and defines the free surface, and a second undercut is formed between the further bending edge and the upper tool body or a scraper associated with the further bending edge.

9. The planar workpiece machining device of claim 1, wherein an orientation of the free surface on the upper tool body is same as an orientation of a free surface on the lower tool body.

10. The planar workpiece machining device of claim 1, wherein at least one of at least one bending edge of the upper tool body or at least one bending edge of the lower tool body is formed as a body edge having a shaping radius or as a rotating roll.

11. The planar workpiece machining device of claim 1, wherein the at least one restoring element is configured to position the counterhold adjacently to the lower bending edge of the counter tool body in an initial position.

12. A planar workpiece processing machine, comprising:
an upper tool comprising:
a clamping shaft,
an upper main body, and
an upper tool body arranged on the upper main body to be opposite the clamping shaft and having an upper bending edge,
wherein the upper tool is moveable along a stroke axis by a stroke drive device in a first direction of a workpiece to be machined, positionable along an upper positioning axis running perpendicularly to the stroke axis, and moveable along the upper positioning axis with an upper traversing movement by a first motor drive assembly;
a lower tool comprising:
a lower main body, and
a lower tool body arranged on the lower main body and counter to the upper tool body, the lower tool body comprising a counter tool body having a lower bending edge and a counterhold provided on the lower main body, wherein the counter tool body is spaced from the counterhold on the lower main body, and the lower bending edge of the counter tool body is oriented to face in a direction of the counterhold,
wherein the lower tool is oriented towards the upper tool, positionable along a lower positioning axis oriented perpendicularly to the stroke axis of the upper tool, and moveable along the lower positioning axis with a lower traversing movement by a second motor drive assembly; and
a controller configured to actuate the first and second motor drive assemblies for moving the upper tool and the lower tool, respectively,
wherein the upper bending edge of the upper tool body is provided to be stationary relative to the upper main body of the upper tool, and the lower bending edge of the lower tool body is provided to be stationary relative to the lower main body of the lower tool,
wherein the upper bending edge of the upper tool is associated with an upper undercut on the upper tool body, and the lower bending edge on the lower tool is associated with a lower undercut on the lower tool body,
wherein the upper traversing movement of the upper tool along the upper positioning axis and the lower traversing movement of the lower tool along the lower positioning axis are each controllable independently of one another,
wherein the upper tool and the lower tool are moveable towards one another to machine the workpiece arranged therebetween, and
wherein the upper tool body comprises a pressure surface, and the upper bending edge is formed on a protruding portion of the upper tool body, wherein the pressure surface transitions into the upper bending edge, from which a free surface of the upper tool body extends,
wherein the counterhold of the lower tool body is counter to at least one restoring element and is insertable into the lower main body along the first direction, and wherein the counterhold is stationary relative to the lower main body along a second direction perpendicular to the first direction and parallel to the lower positioning axis, and the counter tool body is stationary relative to the lower main body along the first direction and the second direction, and
wherein the pressure surface and the free surface are oriented to be at an angle of less than 90°, such that the workpiece on which the pressure surface initially rests is subsequently clamped between the pressure surface and a counter holding surface of the counterhold, and is continuously bent around the upper bending edge towards the free surface of the upper tool body to form a chamfer having a bend angle of less than 90° by i) first moving the upper tool body along the first direction to press the counterhold into the lower main body until the upper bending edge of the upper tool body reaches below the lower bending edge of the counter tool body, and ii) then moving the lower tool body along the second direction to make the lower bending edge of the counter tool body push against a portion of the workpiece to bend around the upper bending edge.

13. The planar workpiece processing machine of claim 12, wherein at least one of the upper tool or the lower tool is controllable independently of one another by a stroke movement or a rotary movement about a corresponding position axis.

14. A method of machining planar workpieces, comprising:
   positioning a workpiece to be machined between an upper tool and a lower tool of a planar workpiece machining device;
   moving the upper tool along a stroke axis by a stroke drive device in a first direction towards the workpiece to be machined;
   positioning and moving the upper tool along an upper positioning axis running perpendicularly to the stroke axis by a first motor drive assembly;
   positioning and moving the lower tool oriented towards the upper tool along a lower positioning axis oriented perpendicularly to the stroke axis of the upper tool by a second motor drive assembly; and
   producing chamfers on a limb of the workpiece by the planar workpiece machining device,
   wherein the first and second motor drive assemblies are actuated by a controller to move the upper tool and the lower tool, respectively,
   wherein the upper tool comprises a clamping shaft, an upper main body, and an upper tool body arranged on the upper main body to be opposite the clamping shaft and having an upper bending edge,
   wherein the lower tool comprises a lower main body and a lower tool body arranged on the lower main body and counter to the upper tool body, the lower tool body comprising a counter tool body having a lower bending edge and a counterhold provided on the lower main body, the counter tool body being spaced from the counterhold on the lower main body, and the lower bending edge of the counter tool body being oriented to face in a direction of the counterhold,
   wherein the upper bending edge of the upper tool body is provided to be stationary relative to the upper main body of the upper tool, and the lower bending edge of the lower tool body is provided to be stationary relative to the lower main body of the lower tool,
   wherein the upper bending edge of the upper tool is associated with an upper undercut on the upper tool body, and the lower bending edge on the lower tool is associated with a lower undercut on the lower tool body,
   wherein the upper tool body comprises a pressure surface, and the upper bending edge is formed on a protruding portion of the upper tool body, wherein the pressure surface transitions into the upper bending edge, from which a free surface of the upper tool body extends,
   wherein the counterhold of the lower tool body is counter to at least one restoring element and is insertable into the lower main body along the first direction, and wherein the counterhold is stationary relative to the lower main body along a second direction perpendicular to the first direction and parallel to the lower positioning axis, and the counter tool body is stationary relative to the lower main body along the first direction and the second direction,
   wherein the pressure surface and the free surface are oriented to be at an angle of less than 90°, such that the workpiece on which the pressure surface initially rests is continuously bent around the upper bending edge towards the free surface of the upper tool body to form one of the chamfers on the limb of the workpiece that has a bend angle of less than 90° and
   wherein producing the chamfers on the limb of the workpiece comprises:
      in a first bending phase, moving the upper tool body along the first direction to press the counterhold into the lower main body until the upper bending edge of the upper tool body reaches below the lower bending edge of the counter tool body, and
      in a second bending phase, moving the lower tool body along the second direction to make the lower bending edge of the counter tool body push against a portion of the workpiece to bend around the upper bending edge.

15. The method of claim 14, wherein producing the chamfers on the limb of the workpiece comprises:
   subsequently to the first bending phase and the second bending phase, controlling at least one of the upper tool or the lower tool by a release movement.

* * * * *